US008906566B2

(12) United States Patent
Mallavarapu et al.

(10) Patent No.: US 8,906,566 B2
(45) Date of Patent: Dec. 9, 2014

(54) FUEL CELL STACK SHUTDOWN OPERATION CONTROLLING ANODE PRESSURE USING DISCHARGE FUEL CONSUMPTION ESTIMATE

(75) Inventors: Kiran Mallavarapu, Melrose, MA (US); Patrick Frost, Tucson, AZ (US); Daniel I Harris, Honeoye Falls, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 729 days.

(21) Appl. No.: 12/716,333

(22) Filed: Mar. 3, 2010

(65) Prior Publication Data

US 2011/0217609 A1    Sep. 8, 2011

(51) Int. Cl.
*H01M 8/04*   (2006.01)
(52) U.S. Cl.
CPC . *H01M 8/04* (2013.01); *Y02E 60/50* (2013.01)
USPC ............................ 429/429; 429/431; 429/444

(58) Field of Classification Search
USPC .......................................... 429/429, 431, 444
See application file for complete search history.

(56) References Cited

U.S. PATENT DOCUMENTS

| | | |
|---|---|---|
| 2005/0181249 A1 | 8/2005 | Logan |
| 2005/0227125 A1 | 10/2005 | Shaffer et al. |
| 2007/0231636 A1 | 10/2007 | Alp et al. |
| 2008/0014472 A1 | 1/2008 | Logan |
| 2008/0138689 A1 | 6/2008 | Leo et al. |
| 2008/0206607 A1 | 8/2008 | Mallavarapu et al. |
| 2008/0311437 A1 | 12/2008 | Sienkowski et al. |
| 2009/0035630 A1* | 2/2009 | Kumada et al. ................. 429/25 |
| 2010/0255397 A1* | 10/2010 | Ishikawa ........................ 429/444 |
| 2010/0316926 A1* | 12/2010 | Ishikawa et al. .............. 429/444 |

FOREIGN PATENT DOCUMENTS

WO    WO 2008078553 A1 *  7/2008
WO    WO 2009063749 A1 *  5/2009

* cited by examiner

*Primary Examiner* — Sean P Cullen
(74) *Attorney, Agent, or Firm* — BrooksGroup

(57) ABSTRACT

A method including shutting down an electrochemical fuel cell stack wherein anode pressure is controlled according to a stack discharge fuel consumption estimate.

19 Claims, 1 Drawing Sheet

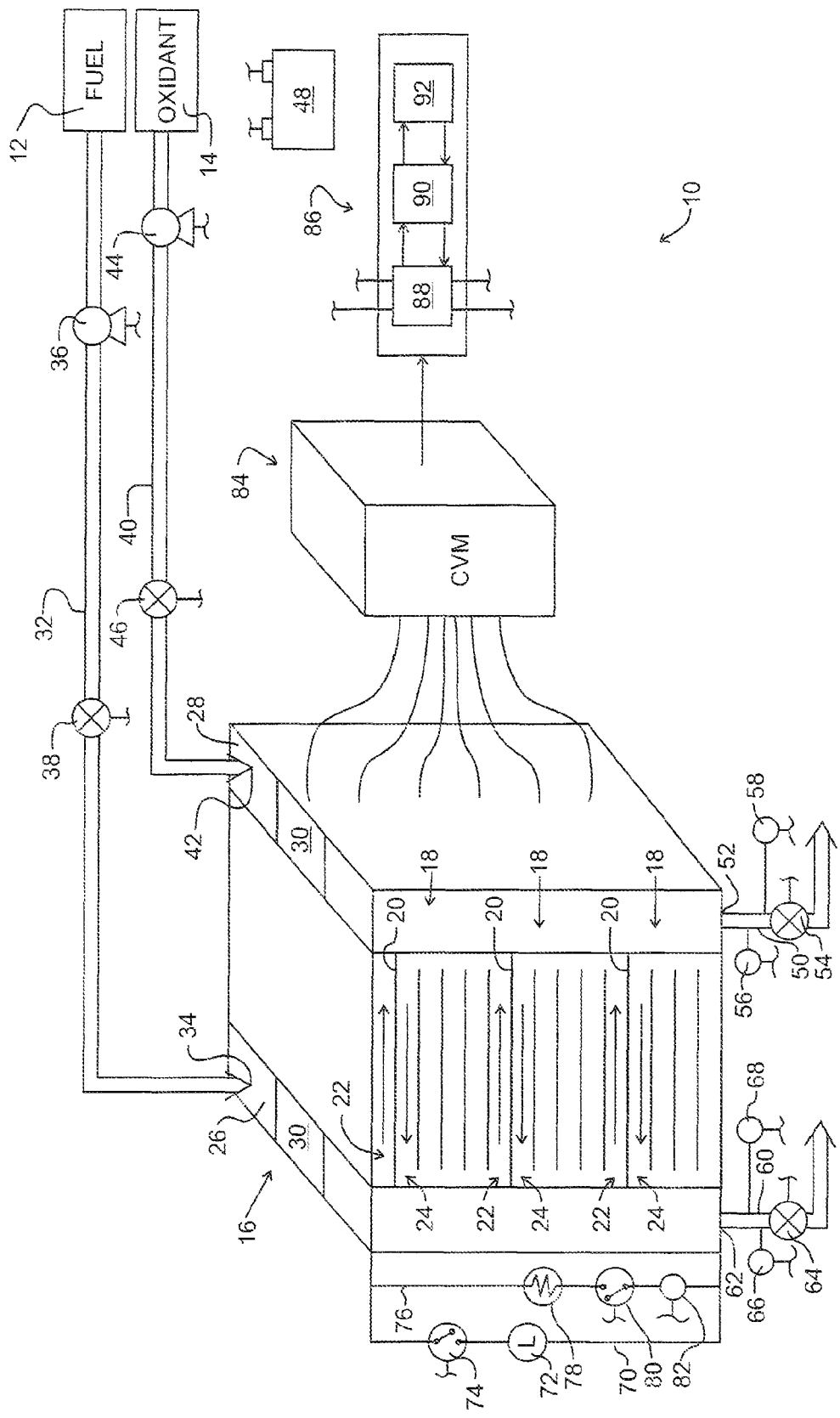

FUEL CELL STACK SHUTDOWN OPERATION CONTROLLING ANODE PRESSURE USING DISCHARGE FUEL CONSUMPTION ESTIMATE

TECHNICAL FIELD

The field to which the disclosure generally relates includes operation of electrochemical fuel cells.

BACKGROUND

Electrochemical fuel cell systems typically include a stack of fuel cells having electrolyte membranes between catalytic anodes and cathodes. During normal operation, fuel flows through the anodes and is catalyzed into useful electrons and byproduct protons, which pass through the membranes to react with an oxidant flowing through the cathodes to produce byproduct water. During shutdown, oxidant flow is terminated but fuel flow is continued according to a pressure setpoint to ensure consumption of all residual oxidant, and the stack is discharged to avoid undesirable fuel cell voltages.

But stack discharge induces rapid reaction of the residual oxidant and the flowing fuel, causing anode pressure to subcede the setpoint. A controller responds by increasing fuel injection, but the residual oxidant is consumed so rapidly that the rate of fuel consumption collapses by the time the additional fuel is actually injected, thereby leading to an excess of anode pressure. In other words, controller lag results in anode pressure overshooting, and any tuning of controller gain to correct overshoot involves unacceptable response time. Accordingly, anode pressure is difficult to maintain at the shutdown setpoint, and resulting anode pressure fluctuations may damage the membranes and cause negative cell voltages on the stack.

SUMMARY OF EXEMPLARY EMBODIMENTS OF THE INVENTION

One exemplary embodiment of a method includes shutting down an electrochemical fuel cell stack including disconnecting the stack from a load, reducing flow of oxidant to a cathode portion of the stack, and discharging the stack through discharge circuitry. The method also includes continuing flow of fuel to an anode portion of the stack for consumption of residual oxidant, wherein anode pressure is controlled according to a stack discharge fuel consumption estimate that is used to generate a feedforward control signal to reduce anode pressure control error during stack shutdown. According to another exemplary embodiment, the fuel consumption estimate is an estimate of a rate of fuel consumption during stack discharge. According to a further exemplary embodiment, the fuel consumption estimate is an estimate of an amount of fuel consumption during stack discharge.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

The FIGURE is a schematic diagram of an exemplary embodiment of a fuel cell system.

DETAILED DESCRIPTION OF EXEMPLARY EMBODIMENTS

The following description of the embodiment(s) is merely exemplary (illustrative) in nature and is in no way intended to limit the invention, its application, or uses.

One exemplary embodiment of a method includes shutting down an electrochemical fuel cell stack, wherein anode pressure is controlled according to a stack discharge fuel consumption estimate that is used to generate a feedforward control signal to reduce anode pressure control error during stack shutdown. According to another exemplary embodiment, the fuel consumption estimate is an estimate of a rate of fuel consumption during stack discharge. According to a further exemplary embodiment, the fuel consumption estimate is an estimate of an amount of fuel consumption during stack discharge.

An exemplary operating environment is illustrated in the FIGURE, and may be used to implement one or more methods of operating a fuel cell stack. The methods may be carried out using any suitable system and, for example, may be carried out in conjunction with a fuel cell system such as system 10. The following system description simply provides a brief overview of one exemplary fuel cell system, but other systems and components not shown here could also be used.

The fuel cell system 10 may include a fuel source 12, an oxidant source 14, and a fuel cell stack 16 coupled to the fuel and oxidant sources 12, 14. In one embodiment, the fuel source 12 may include a source of hydrogen, for example, compressed hydrogen gas or liquid hydrogen, methanol, methane, or the like. Likewise, in one embodiment, the oxidant source 14 may include a source of oxygen, for example, oxygen gas, oxygen in air, or the like. The stack 16 may include plurality of individual fuel cells 18 to produce electrical power from a reaction of fuel and oxidant received from the fuel and oxidant sources 12, 14. Each cell 18 may include an electrolyte membrane 20, which may have an anode side 22 that may include an anode reactant gas flow field, and a cathode side 24 that may include a cathode reactant gas flow field. The stack 16 may include an anode manifold 26, a cathode manifold 28, and coolant manifolds 30. An anode portion of the stack 16 may include the anode manifold 26 and anode flow fields. Similarly, a cathode portion of the stack 16 may include the cathode flow fields and the cathode manifold 28.

Any suitable reactant supply apparatus may be used. For example, a fuel supply conduit 32 may be coupled between the fuel source 12 and the stack 16 at an inlet 34 to the anode manifold 26. A fuel compressor 36 may be provided in communication with the fuel supply conduit 32 downstream of the fuel source 12. One or more fuel supply valves 38 may be provided in communication with the fuel supply conduit 32 downstream of the fuel compressor 36. The fuel supply valve(s) 38 may include one or more anode pressure control valves, fuel injectors, and/or the like (not separately shown).

In another example of reactant supply apparatus, an oxidant supply conduit 40 may be coupled between the oxidant source 14 and the stack 16 at an inlet 42 to the cathode manifold 28. An oxidant compressor 44 may be provided in communication with the oxidant supply conduit 40 downstream of the oxidant source 14. One or more oxidant supply valves 46 may be provided in communication with the oxidant supply conduit 40 downstream of the oxidant compressor 44. The oxidant supply valve(s) 46 may include one or more cathode pressure control valves, oxidant injectors, and/or the like (not separately shown). The compressors 36, 44 and valves 38, 46 may be electrically powered, for example, by a power supply 48 and/or an electrical connection to the stack 16, or in any other suitable manner. The power supply 48 may include a battery, capacitor, or any other suitable electrical storage device. For clarity, the individual electrical connections are not shown in the FIGURE.

Any suitable reactant exhaust apparatus may be used. For example, an anode exhaust conduit 50 may be coupled to the stack 16 at an outlet 52 of the anode manifold 26. One or more anode exhaust valves 54 may be provided in communication with the anode exhaust conduit 50 and may include at least one of the following types of valves: a backpressure valve, a bleed valve, a drain valve, or a purge valve. An anode pressure sensor 56 and/or an anode temperature sensor 58 may be provided in communication with the anode manifold 26, for example, in communication with the anode exhaust conduit 50 or in any other suitable location. As used herein, the terminology "anode pressure" may include anode pressure in an anode portion of a fuel cell stack. The anode exhaust conduit 50 may be provided in communication with the fuel source 12 for recirculation of fuel, or with a water separator (not shown), or with any other suitable device(s). In another example, a cathode exhaust conduit 60 may be coupled to the stack 16 at an outlet 62 of the cathode manifold 28. One or more cathode exhaust valves 64 may be provided in communication with the cathode exhaust conduit 60 and may include any suitable type of valve. A cathode pressure sensor 66 and/or cathode temperature sensor 68 may be provided in communication with the cathode manifold 28, for example, in communication with the cathode exhaust conduit 60 or in any other suitable location. The cathode exhaust conduit 60 may be provided in communication with any suitable downstream device(s). As used herein, the terminology "cathode pressure" may include oxidant pressure in a cathode portion of a fuel cell stack.

Load circuitry 70 may be connected to the fuel cell stack 16 and may include a load 72 and a load switch 74 to connect and disconnect the load 72 from the fuel cell stack 16. In one example, the load 72 may be an electric motor or machine for propelling a vehicle. Stack discharge circuitry 76 is connected to the fuel cell stack 16 and may include a stack discharge device 78, a discharge switch 80 for connecting and disconnecting the discharge device 78 to the fuel cell stack 16, and a discharge current sensor 82 to monitor discharge current.

The fuel cell system 10 may also include a voltage monitoring device 84 coupled to the stack 16 to monitor individual voltages of the cells 18, one or more of groups of the cells 18, and/or overall voltage of the stack 16. In one illustrative embodiment, the voltage monitoring device 84 may be a separate cell voltage monitor (CVM). In another exemplary embodiment, the voltage monitoring device 84 may be a portion of a fuel cell controller 86.

The controller 86 may include, for example, an electrical circuit, an electronic circuit or chip, and/or a computing device. In the computing device embodiment, the controller 86 generally may include one or more interfaces 88, processors 90, and memory devices 92 to control operation of the system 10. For clarity, the individual monitoring and control connections are not shown in the FIGURE. In general, the controller 86 may receive and process input from the various other system devices in light of stored instructions and/or data, and transmit output signals the various other system devices, for example, to startup the stack 16, increase or decrease output of the stack 16, to shutdown the stack 16, and/or the like.

The processor(s) 90 may execute instructions that provide at least some of the functionality for the system 10. As used herein, the term instructions may include, for example, control logic, computer software and/or firmware, programmable instructions, or other suitable instructions. The processor(s) 90 may include, for example, one or more microprocessors, microcontrollers, application specific integrated circuits, and/or any other suitable type of processing device(s).

The memory device(s) 92 may be configured to provide storage for data received by or loaded to the system 10, and/or for processor-executable instructions. The data and/or instructions may be stored, for example, as look-up tables, formulas, algorithms, maps, models, and/or any other suitable format. The memory device(s) 92 may include, for example, RAM, ROM, EPROM, and/or any other suitable type of storage device(s).

The interface(s) 88 may include, for example, analog/digital or digital/analog converters, signal conditioners, amplifiers, filters, other electronic devices or software modules, and/or any other suitable interface(s). The interface(s) 88 may conform to, for example, RS-232, parallel, small computer system interface, universal serial bus, CAN, MOST, LIN, FlexRay, and/or any other suitable protocol(s). The interface(s) 88 may include circuits, software, firmware, or any other device to assist or enable the controller 86 in communicating with other devices.

Finally, although not shown, the system 10 may also include various other conduit, valves, pumps, compressors, coolant sources, condition sensors, and any other suitable components and/or devices. Those of ordinary skill in the art are familiar with the general structure and function of such elements of fuel cell systems such that a more complete description is not necessary here.

During normal operation of the fuel cell stack 16, the oxidant supply valve 46 in the oxidant supply conduit 40 is open and the cathode exhaust valve 64 in the cathode exhaust conduit 60 is also open so that the oxidant can be delivered through the cathode portion of the fuel cell stack 16, for example, under pressurization from the oxidant compressor 44. Also, the fuel supply valve 38 in the fuel supply conduit 32 is open and the anode exhaust valve 54 in the anode exhaust conduit 50 is also open so that fuel may be delivered through the anode portion of the fuel cell stack 16, for example, under pressurization from the fuel compressor 36 and/or the fuel source 12.

Flow and/or pressure control of reactants to, through, and/or out of the stack 16 may be controlled in any suitable manner. For example, the controller 86 may monitor temperature, pressure, and/or any other suitable fluid conditions via the sensors 56, 58, 66, 68 and may also monitor voltage from the voltage monitoring device 84. The controller 86 may process such signals in light of stored instructions and data to produce output signals to control the compressors 36, 44, and valves 38, 46, 54, 64.

One embodiment may include a method of shutting down an electrochemical fuel cell stack that may be at least partially carried out as one or more computer programs within the operating environment of the system 10 described above. Those skilled in the art will also recognize that a method according to any number of embodiments may be carried out using other fuel cell systems within other operating environments. As the description of the method progresses, reference will be made to the exemplary system 10 of the FIGURE.

A fuel stack may be disconnected from a load to initiate stack shutdown. For example, the load 72 may be disconnected from the fuel cell stack 16 by opening the load switch 74 in the load circuitry 70. Auxiliary power, for example, from the power supply 48 may be used to operate various components of the fuel cell stack 16, including the compressors 36, 44 and valves 38, 46, 54, 64. As such, an open circuit voltage is avoided.

Flow of oxidant to a cathode portion of a fuel cell stack may be reduced. For example, the oxidant supply valve 46 in the oxidant supply conduit 40 may be partially or entirely closed and/or the oxidant compressor 44 may be deactivated after the stack 16 is disconnected from the load 72.

Similarly, flow of anode exhaust gas from an anode portion of a fuel cell stack may be reduced. For example, the anode exhaust valve 54 in the anode exhaust conduit 50 may be closed simultaneously or after the flow of oxidant to the cathode portion of the stack 16 is reduced.

In any event, flow of fuel may be continued to an anode portion of a fuel cell stack for consumption of residual oxidant. For example, the fuel supply valve 38 may remain open and/or the fuel compressor 36 may continue to operate. Accordingly, anode pressure may be maintained in the anode portion of the fuel cell stack 16 at a pressure above ambient to prevent oxidant or oxidant constituents from intruding into the anode portion of the stack 16 while the cathode portion of the stack 16 is still filled with unconsumed oxidant. Stack output voltage may begin to drop.

A fuel cell stack may be discharged. For example, the normally open discharge switch 80 in the discharge circuitry 76 may be closed to connect the discharge device 78 to the fuel cell stack 16. Accordingly, the stack 16 may be shorted in a controlled fashion, for example, according to any suitable discharge current decay profile. In one embodiment the discharge switch 80 is closed after voltage has dropped to a desired level, for example, approximately 0.2V/cell.

Anode pressure is controlled according to a stack discharge fuel consumption estimate that is used to generate a feedforward control signal to reduce anode pressure control error during stack shutdown. The stack 16 may be discharged, for example, upon stack shutdown. To maintain anode pressure in the anode portion, yet ensure complete consumption of oxygen in the cathode portion, the discharge fuel consumption estimate may be determined as a function of an oxidant consumption estimate.

In one example, the discharge fuel consumption estimate may be a rate of discharge fuel consumption, which may be calculated as follows:

$$\dot{n}_{H2,Consumed\_by\_resistor} = 2 \cdot \dot{n}_{O2,Consumed\_by\_resistor} \quad \text{Eq. 1}$$

where, $\dot{n}_{H2,Consumed\_by\_resistor}$ is the rate moles of fuel consumed by activation of the discharge circuitry, and $\dot{n}_{O2,Consumed\_by\_resistor}$ is the rate of moles of oxidant consumed by activation of the discharge circuitry.

In another example, the rate may integrated to determine an estimated amount of discharge fuel consumption, represented by the following equation:

$$\int \dot{n}_{H2,Consumed\_by\_resistor} = n_{H2,Consumed\_by\_resistor} \quad \text{Eq. 2}$$

where $n_{H2,Consumed\_by\_resistor}$ is the amount of moles consumed by activation of the discharge circuitry.

According to one embodiment of the method, the oxidant consumption estimate may include a calculation of a rate of discharge oxidant consumption by using an input of measured discharge current flowing through the discharge circuitry during discharging. For example, the current sensor 82 in the discharge circuitry 76 may be used to indicate discharge current.

The calculation of the rate of discharge oxidant consumption may include the following equation, with exemplary units:

$$\dot{n}_{O2,Consumed\_by\_resistor} = \frac{i_{resistor} \cdot N_{\#\,cells}}{4 \cdot Fa} \quad \text{Eq. 3}$$

where, $\dot{n}_{O2,Consumed\_by\_resistor}$ is discharge oxidant consumption, $i_{resistor}$ is the measured discharge current (amps), $N_{\#cells}$ is the quantity of cells in the stack, 4 is the quantity of moles of electrons, and Fa is Faraday's constant (96485 coulomb/mol).

A pressure adjustment ($P_{adjust}$) may be calculated in accord with the following equation, with exemplary units:

$$n_{H2,Consumed\_by\_resistor} = 2 \cdot n_{O2,Consumed\_by\_resistor} + \frac{\Delta P_{Desired} \cdot V_{An}}{R \cdot T} \quad \text{Eq. 4}$$

where, $\Delta P_{Desired}$ = change in pressure desired in the anode (kPa) =

$$P_{adjust} - P_{initial}$$

$V_{An}$ = volume of the anode (L)

T = absolute temperature of the gas (Kelvin)

R = universal gas constant (8.314 $L*kPa/(K*mol)$).

Therefore, $P_{adjust}$ may be solved for to provide a feedforward control signal to the controller 86 to adjust anode pressure in any suitable manner.

According to another embodiment of the method, the oxidant consumption estimate may include a calculation of an amount of discharge oxidant consumption including molar concentration of oxidant in the cathode portion of the stack. The calculation of the amount of discharge oxidant consumption may include the following equation:

$$n_{O_2} = C_{O_2} \cdot V_{Cathode} \quad \text{Eq. 5}$$

where, $N_{O_2}$ is the amount of discharge oxidant consumption, $V_{Cathode}$ is the volume of the cathode portion, and $C_{O_2}$ is the volumetric molar concentration of oxidant in the cathode portion, and may be calculated according to the following equation, with exemplary units:

$$C_{O_2} = \frac{P_{O_2}}{R \cdot T} \quad \text{Eq. 6}$$

where, $P_{O_2}$=pressure of the oxidant (kPa)

T=absolute temperature of the oxidant (K)

R=universal gas constant (8.314 $L*kPa/(K*mol)$).

The discharge fuel consumption estimate may be an amount of discharge fuel consumption, which may be calculated as follows:

$$n_{H2} = 2 \cdot n_{O2}. \quad \text{Eq. 7}$$

Also, a pressure adjustment ($P_{adjust}$) may be calculated in accord with the following equation, with exemplary units:

$$n_{H2} = 2 \cdot n_{O2} + \frac{\Delta P_{Desired} \cdot V_{An}}{R \cdot T} \qquad \text{Eq. 8}$$

where, $\Delta P_{Desired}$ = change in pressure desired in the anode (kPa) =

$P_{adjust} - P_{initial}$ $V_{An}$ = volume of the anode (L)

$T$ = absolute temperature of the gas (Kelvin)

$R$ = universal gas constant (8.314 $L * kPa/(K * mol)$).

Therefore, $P_{adjust}$ may be solved for to provide a feedforward control signal to the controller 86 to adjust anode pressure in any suitable manner.

When the cell voltage drops to approximately 0.05V, oxygen in the cathode portion has been completely consumed by hydrogen crossing over from the anode portion through the membranes 20 to the cathode portion. The cathode portion is now substantially filled with nitrogen and water vapor. Thereafter, the cathode exhaust valve 64 in the cathode exhaust conduit 60 may be closed and the fuel supply valve 38 in the fuel supply conduit 32 also may be closed, thereby maintaining a positive pressure in the anode portion to compensate for pressure loss due to stack temperature reduction and water vapor condensation.

The method may be performed as a computer program and the various voltages, constants, and any other parameter values may be stored in memory as one or more look-up tables or the like. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable or usable medium, which include one or more storage devices and/or signals, in compressed or uncompressed form. Exemplary computer usable storage devices include conventional computer system RAM (random access memory), ROM (read only memory), EPROM (erasable, programmable ROM), EEPROM (electrically erasable, programmable ROM), and magnetic or optical disks or tapes. It is therefore to be understood that the method may be at least partially performed by any device(s) capable of executing the above-described functions.

The above description of embodiments of the invention is merely exemplary in nature and, thus, variations thereof are not to be regarded as a departure from the spirit and scope of the invention.

What is claimed is:

1. A method comprising:
shutting down an electrochemical fuel cell stack comprising:
disconnecting the stack from a load;
reducing flow of oxidant to a cathode portion of the stack;
discharging the stack through discharge circuitry;
continuing flow of fuel to an anode portion of the stack for consumption of residual oxidant;
controlling anode pressure according to a stack discharge fuel consumption estimate; and
generating a feedforward control signal using the stack discharge fuel consumption estimate, to reduce anode pressure control error during stack shutdown.

2. The method of claim 1 wherein the discharge fuel consumption estimate is a function of an oxidant consumption estimate.

3. The method of claim 2 wherein the oxidant consumption estimate includes a calculation of a rate of discharge oxidant consumption by using an input of measured discharge current flowing through the discharge circuitry during discharging.

4. The method of claim 3 wherein the calculation of the rate of discharge oxidant consumption includes the following equation:

$$\dot{n}_{O2,Consumed\_by\_resistor} = \frac{i_{resistor} \cdot N_{\# cells}}{4 \cdot 96485}$$

$\dot{n}_{O2,Consumed\_by\_resistor}$ is the rate of discharge oxidant consumption, $i_{resistor}$ is the measured discharge current, $N_{\#cells}$ is the quantity of cells in the stack, 4 is the quantity of moles of electrons, and 96485 is Faraday's constant in coulomb/mol.

5. The method of claim 4 wherein the rate of discharge fuel consumption is integrated to determine an estimated amount of discharge fuel consumption $n_{H2,Consumed\_by\_resistor}$.

6. The method of claim 5 wherein a pressure adjustment ($P_{adjust}$) is calculated in accord with the following equation:

$$n_{H2,Consumed\_by\_resistor} = 2 \cdot n_{O2,Consumed\_by\_resistor} + \frac{\Delta P_{Desired} \cdot V_{An}}{R \cdot T}$$

where, $\Delta P_{Desired}$ = change in pressure desired in the anode (kPa) = $P_{adjust} - P_{initial}$ $V_{An}$ = volume of the anode (L)

$T$ = absolute temperature of the gas (Kelvin)

$R$ = universal gas constant (8.314 $L * kPa/(K * mol)$).

7. The method of claim 2 wherein the discharge fuel consumption estimate is a rate of discharge fuel consumption, which is calculated as follows:

$$\dot{n}_{H2,Consumed\_by\_resistor} = 2 \cdot \dot{n}_{O2,Consumed\_by\_resistor}$$

8. The method of claim 2 wherein the oxidant consumption estimate includes a calculation of an amount of discharge oxidant consumption including molar concentration of oxidant in the cathode portion.

9. The method of claim 8 wherein the calculation of the amount of discharge oxidant consumption includes the following equation:

$$n_{O_2} = C_{O_2} \cdot V_{Cathode}$$

where, $n_{O_2}$ is the amount of discharge oxidant consumption, $C_{O_2}$ is the volumetric molar concentration of oxidant in the cathode portion, and $V_{Cathode}$ is the volume of the cathode portion.

10. The method of claim 9 wherein $C_{O_2}$ is calculated according to the following equation:

$$C_{O_2} = \frac{P_{O_2}}{R \cdot T}$$

where, $P_{O_2}$=pressure of the oxidant (kPa)

T=absolute temperature of the oxidant (K)

R=universal gas constant (8.314 L*kPa/(K*mol)).

11. The method of claim 2 wherein the discharge fuel consumption estimate is an amount of discharge fuel consumption, which is calculated as follows:

$$n_{H2} = 2 \cdot n_{O2}.$$

12. A method comprising:
shutting down an electrochemical fuel cell stack comprising:
   disconnecting the stack from a load;
   reducing flow of oxidant to a cathode portion of the stack;
   discharging the stack through discharge circuitry;
   continuing flow of fuel to an anode portion of the stack for consumption of residual oxidant;
   controlling anode pressure according to an estimate of a rate of fuel consumption during stack discharge; and
   generating a feedforward control signal using the estimate of a rate of fuel consumption during stack discharge to reduce anode pressure control error during stack shutdown.

13. The method of claim 12, wherein the estimate of a rate of fuel consumption is a function of an oxidant consumption estimate, which includes a calculation of a rate of discharge oxidant consumption by using an input of measured discharge current flowing through the discharge circuitry during discharging.

14. The method of claim 13 wherein the calculation of the rate of discharge oxidant consumption includes the following equation:

$$\dot{n}_{O2,Consumed\_by\_resistor} = \frac{i_{resistor} \cdot N_{\# cells}}{4 \cdot 96485}$$

$\dot{n}_{O2,Consumed\_by\_resistor}$ is the rate of discharge oxidant $i_{resistor}$ is the measured discharge current in amps, $N_{\#cells}$ is the quantity of cells in the stack, 4 is the quantity of moles of electrons, and 96485 is Faraday's constant in coulomb/mol.

15. The method of claim 14 wherein the discharge fuel consumption is calculated as follows:

$$\dot{n}_{H2,Consumed\_by\_resistor} = 2 \cdot \dot{n}_{O2,Consumed\_by\_resistor}.$$

16. The method of claim 14 wherein the rate of discharge oxidant consumption is integrated to determine an estimated amount of discharge fuel consumption $n_{H2,Consumed\_by\_resistor}$, and wherein a pressure adjustment ($P_{adjust}$) is calculated in accord with the following equation:

$$n_{H2,Consumed\_by\_resistor} = 2 \cdot n_{O2,Consumed\_by\_resistor} + \frac{\Delta P_{Desired} \cdot V_{An}}{R \cdot T}$$

where, $\Delta P_{Desired}$ = change in pressure desired in the anode (kPa) = $P_{adjust} - P_{initial}$ $V_{An}$ = volume of the anode (L)

T = absolute temperature of the gas (Kelvin)

R = universal gas constant (8.314 L*kPa/(K*mol)).

17. A method comprising:
shutting down an electrochemical fuel cell stack comprising:
   disconnecting the stack from a load;
   reducing flow of oxidant to a cathode portion of the stack;
   discharging the stack through discharge circuitry;
   continuing flow of fuel to an anode portion of the stack for consumption of residual oxidant;
   controlling anode pressure according to an oxidant consumption estimate during stack discharge; and
   generating a feedforward control signal using the oxidant consumption estimate during stack discharge, to reduce anode pressure control error during stack shutdown.

18. The method of claim 17 wherein the oxidant consumption estimate includes the following equation:

$$n_{O_2} = C_{O_2} \cdot V_{Cathode}$$

where, $n_{O_2}$ is the amount of discharge oxidant consumption, $V_{Cathode}$ is the volume of the cathode portion, and $C_{O_2}$ is the volumetric molar concentration of oxidant in the cathode portion, wherein $C_{O_2}$ is calculated according to the following equation:

$$C_{O_2} = \frac{P_{O_2}}{R \cdot T}$$

where, $P_{O_2}$=pressure of the oxidant (kPa)

T=absolute temperature of the oxidant (K)

R=universal gas constant (8.314 L*kPa/(K*mol)).

19. A method comprising:
shutting down an electrochemical fuel cell stack comprising:
   disconnecting the stack from a load;
   reducing flow of oxidant to a cathode portion of the stack;
   discharging the stack through discharge circuitry;
   continuing flow of fuel to an anode portion of the stack for consumption of residual oxidant;
   controlling anode pressure according to a discharge fuel consumption estimate determined as a function of an oxidant consumption estimate, wherein the oxidant consumption estimate includes a calculation of an amount of discharge oxidant consumption within a cathode portion of the stack;
   generating a feedforward control signal using the oxidant consumption estimate during stack discharge to reduce anode pressure control error during stack shutdown; and
   wherein the stack completely consumes oxygen within the cathode portion of the stack.

* * * * *